(12) United States Patent
Cao et al.

(10) Patent No.: US 12,244,514 B2
(45) Date of Patent: Mar. 4, 2025

(54) INTELLIGENT PACKET DISTRIBUTION CONTROL FOR OPTIMIZING SYSTEM PERFORMANCE AND COST

(71) Applicant: Cisco Technology, Inc., San Jose, CA (US)

(72) Inventors: Feng Cao, Fremont, CA (US); Harikrishnan Pillai, San Jose, CA (US); Jonathan Rosen, Cary, NC (US)

(73) Assignee: Cisco Technology, Inc.

( * ) Notice: Subject to any disclaimer, the term of this patent is extended or adjusted under 35 U.S.C. 154(b) by 0 days.

(21) Appl. No.: 17/858,530

(22) Filed: Jul. 6, 2022

(65) Prior Publication Data

US 2024/0015110 A1 Jan. 11, 2024

(51) Int. Cl.
*H04L 47/762* (2022.01)
*G06F 11/34* (2006.01)
*H04L 45/00* (2022.01)
*H04L 47/80* (2022.01)

(52) U.S. Cl.
CPC ........ *H04L 47/762* (2013.01); *G06F 11/3409* (2013.01); *H04L 45/38* (2013.01); *H04L 47/801* (2013.01)

(58) Field of Classification Search
CPC ..... H04L 47/762; H04L 45/38; H04L 47/801; G06F 11/3409
See application file for complete search history.

(56) References Cited

U.S. PATENT DOCUMENTS

| | | |
|---|---|---|
| 10,140,161 B1 | 11/2018 | Singh et al. |
| 2001/0037387 A1 | 11/2001 | Gilde et al. |
| 2007/0041326 A1* | 2/2007 | Babiarz ................. H04L 47/17 370/248 |
| 2007/0121516 A1* | 5/2007 | Hannel ............... H04L 67/1029 370/389 |
| 2011/0299445 A1 | 12/2011 | Calvanese Strinati |
| 2016/0239065 A1 | 8/2016 | Lee et al. |
| 2018/0167329 A1 | 6/2018 | Srinivasan et al. |
| 2019/0319862 A1 | 10/2019 | Zaifman et al. |
| 2020/0379907 A1 | 12/2020 | Rostykus et al. |
| 2021/0224138 A1* | 7/2021 | Wang ..................... G06F 9/546 |
| 2021/0263773 A1 | 8/2021 | Shah |
| 2022/0158936 A1* | 5/2022 | Cao ......................... H04L 45/22 |
| 2022/0393974 A1* | 12/2022 | Wen ........................ H04L 45/54 |
| 2023/0006906 A1* | 1/2023 | Shu .......................... H04L 47/34 |

OTHER PUBLICATIONS

International Search Report and Written Opinion for International Application No. PCT/US2023/069650 mailed Nov. 7, 2023, 15 Pages.

* cited by examiner

*Primary Examiner* — Joe Chacko
(74) *Attorney, Agent, or Firm* — Merchant & Gould P.C.

(57) ABSTRACT

Intelligent distribution of packet flows may be provided. Compute resource data may be received. Next, packets may be classified into flows that may be persistently mapped to compute resources for a lifetime of the flows. Based on the compute resource data, the flows may then be allocated to the compute resources.

20 Claims, 3 Drawing Sheets

INTELLIGENT PACKET DISTRIBUTION CONTROL FOR OPTIMIZING SYSTEM PERFORMANCE AND COST

TECHNICAL FIELD

The present disclosure relates generally to providing intelligent packet distribution control.

BACKGROUND

A Software Defined Wide Area Network (SDWAN) is a WAN that uses software-defined network technology, such as communicating over the Internet using overlay tunnels that are encrypted when destined for internal organization locations. If standard tunnel setup and configuration messages are supported by all of the network hardware vendors, SDWAN simplifies the management and operation of a WAN by decoupling the networking hardware from its control mechanism. This concept is similar to how software defined networking implements virtualization technology to improve data center management and operation. In practice, proprietary protocols may be used to set up and manage an SDWAN, meaning there may be no decoupling of the hardware and its control mechanism.

A application of SDWAN is to allow enterprises to build higher-performance WANs using lower-cost and commercially available Internet access, enabling the enterprises to partially or wholly replace more expensive private WAN connection technologies such as Multi-Protocol Label Switching (MPLS). When SDWAN traffic is carried over the Internet, there are no end-to-end performance guarantees. Carrier MPLS Virtual Private Network (VPN) WAN services are not carried as Internet traffic, but rather over carefully controlled carrier capacity, and do come with an end-to-end performance guarantee.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
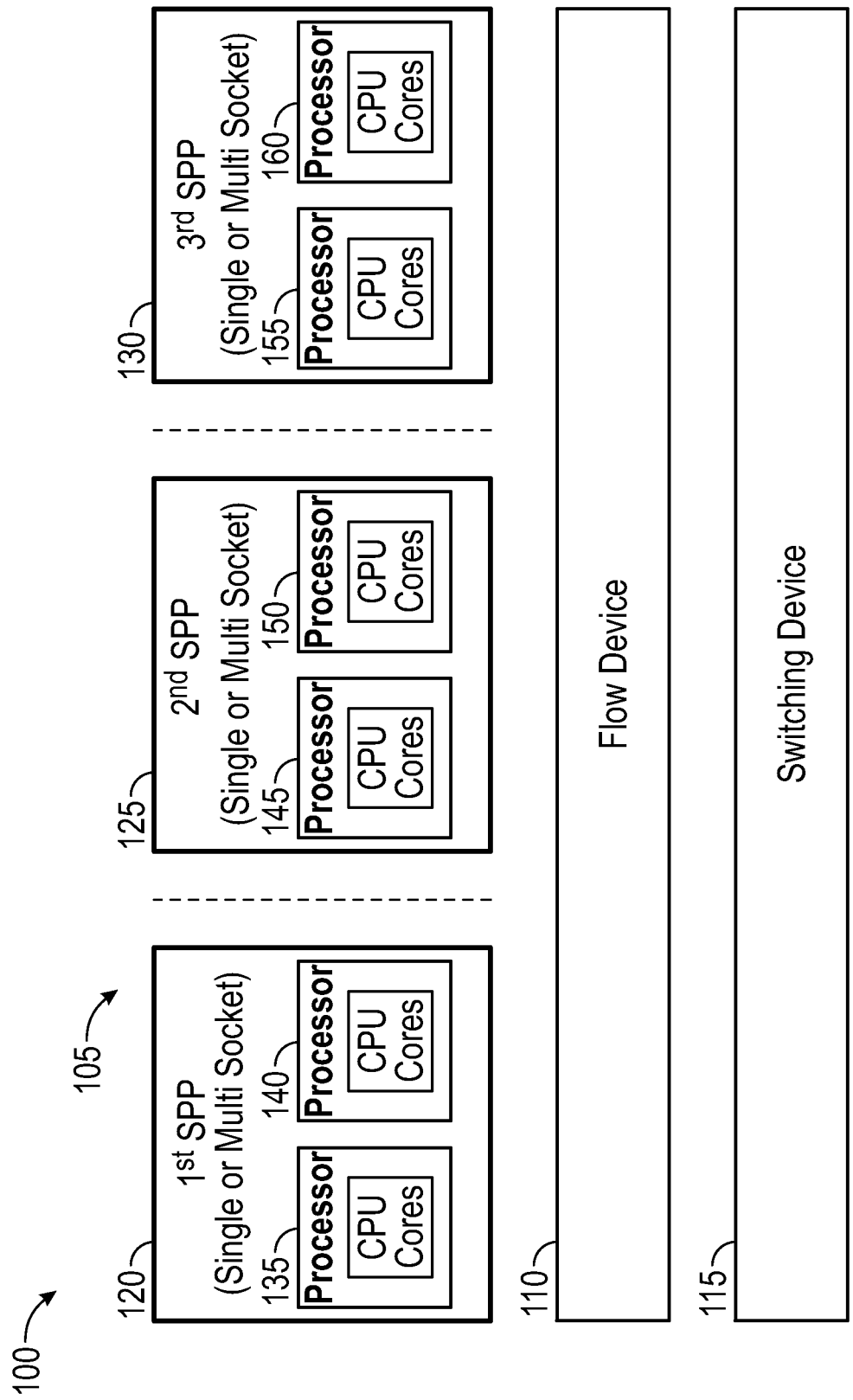
FIG. 1 is a block diagram of an operating environment for providing intelligent distribution of packet flows.

Intelligent distribution of packet flows may be provided. Compute resource data may be received. Next, packets may be classified into flows that may be persistently mapped to compute resources for a lifetime of the flows. Based on the compute resource data, the flows may then be allocated to the compute resources.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A Next Generation SDWAN Head End (NG-SDWAN-HE) platform may use a hybrid model comprising one switching Application Specific Integrated Circuit (ASIC) and one or more Stateful Packet Processors (SPPs). Each SPP may comprise one or more processors with each processor comprising multiple Central Processing Unit (CPU) cores acting as a single processing complex.

A single SPP complex may be designed to support, for example, from 35 to 70 Mega Packet Per Second (MPPS) while performing a combination of complex features required for SDWAN processing. The number of CPU cores available in each SPP complex may be dependent upon the current available technology, but the number of CPU cores per SPP complex may be in the range of 64 to 96 CPU cores for example. The performance of these CPU cores may be a function of their architecture, frequency, caching, memory bandwidth, and various other attributes. Some of these attributes may be variable and may be adjusted over time to influence system performance and power consumption for example.

Packets received from the switch ASIC may be distributed to multiple SPP CPU cores based on packet flow tuple information. Various forms of hashing of Layer 2 (L2), Layer 3 (L3), and Layer 4 (L4) packet headers may be used to direct packets of the same flow to different CPU cores where features may be applied. This stateless flow-based distribution based upon hashing may have the advantage of eliminating the locking needed by per-flow stateful features and may behave well when flows are distributed in an optimal fashion. However, there may be drawbacks with this distribution such as the risk of unbalanced distribution of workload and limited maximum single flow (i.e., an elephant flow) performance. By employing more intelligent distribution of work and adjusting system parameters, embodiments of the disclosure may address some of these drawbacks.

Conventional processes may assume a balanced hash-based distribution of work across all CPU cores and a thermal budget based upon the maximum nominal performance for which all CPU cores may be run simultaneously while under worse case thermal conditions. Using such worse case planning may make it more challenging to achieve the performance goals of more compact and power limited designs. To support various form factors, including smaller one rack unit box designs where thermal, power, and real estate limits may be challenging, it may be advantageous to make more efficient use of the available SPP resources while still meeting power, thermal, and form-factor requirements.

The above conventional approach requires no awareness of the available performance of a CPU core that a packet may be distributed to, nor the type of processing the CPU core may have to perform for that packet based on previous packets of that same flow, making proper workload distribution reliant on good statistical distribution of flows, per-flow processing, and per-flow bandwidth. Embodiments of the disclosure, however, may distribute work more intelligently across the available CPU cores while dynamically adjusting available processing capacity and power consumption over time taking into consideration current load, desired performance, and operating environment. By doing so embodiments of the disclosure may provide more efficient systems that on average may meet a desired performance and power requirements without having to design for worse case conditions.

In certain processor architectures, the CPU core frequency of some cores may be adjusted above the nominal frequency when the frequency of other cores is below the nominal frequency. This boost in frequency may allow for higher individual CPU core performance. This may make it advantageous to try to minimize the number of active CPU cores when such cores are not fully utilized so that other CPU cores may run at higher frequencies thus allowing for high single flow performance or for avoiding being oversubscribed due to dynamically changing flow performance characteristics.

Furthermore, performance of these CPU cores may be affected by the ambient environment. For example, for a processor that has 96 cores available, at 25 degrees Celsius ambient it may be possible that 64 of those cores may run at a frequency of 3.0 GHz (i.e., turbo) while at 35 degrees Celsius ambient only half of those cores may be available to run at 3.0 GHz. Additionally, if there are two sockets, it may be better to distribute some flows to another socket to achieve maximum performance. There may be other architecture and system specific characteristics that may vary over normal operation life that could have an impact on the overall system compute capacity that may also need to be taken into consideration.

Conventional flow based systems distribute packets to packet processing compute resources and rely on naive distribution processes like stateless packet header hashing and static configuration of resources such as hardware frequencies and buffering. These conventional processes may result in non-optimal distribution of workload and inefficient use of hardware resources. Such non-optimal and inefficient processes may result in poor performance and may force system designers to over-engineer for such things as available compute capacity, buffering, power, and space resulting in increased system cost and or lower system performance.

Embodiments of the disclosure may provide a more intelligent approach to flow distribution that may consider device capabilities, environmental variables, and current system status. Furthermore, embodiments of the disclosure may adjust system behavior to better meet current and predicted packet processing workload demands. Thus a more efficient use of resources may be achieved resulting in higher performance at lower system costs for example.

FIG. 1 shows an operating environment 100 for providing intelligent distribution of packet flows. As shown in FIG. 1, operating environment 100 may comprise a plurality of Stateful Packet Processors (SPPs) 105, a flow device 110, and a switching device 115. Plurality of SPPs 105 comprise a first SPP 120, a second SPP 125, and a third SPP 130. First SPP 120 may comprise a first SPP first processor 135 and a first SPP second processor 140. Second SPP 125 may comprise a second SPP first processor 145 and a second SPP second processor 150. Third SPP 130 may comprise a third SPP first processor 155 and a third SPP second processor 160.

FIG. 1 shows plurality of SPPs 105 comprising three SPPs, however, plurality of SPPs 105 is not limited to three SPPs and may comprise any number of SPPs. Each of first SPP 120, second SPP 125, and third SPP 130 are shown as having two processors, however, each of first SPP 120, second SPP 125, and third SPP 130 are not limited to two processor and may comprise any number of processors. Accordingly, each of plurality of SPPs 105 may comprise one or more processors. Each of the processors may comprise multiple CPU cores acting as a single processing complex for example. The number of CPU cores available in each SPP complex may be dependent upon the current available technology, but the number of CPU cores per SPP complex may be in the range of 64 to 96 CPU cores for example.

Switching device 115 may comprise a switching ASIC and may receive packets associated with flows. Flow device 110 may receive the packets and distribute them to cores within plurality of SPPs 105 consistent with embodiments of the disclosure. Consistent with embodiments of the disclosure, flow device 110 may comprise a Field Programmable Gate Array (FPGA) for example.

The elements described above of operating environment 100 (e.g., flow device 110 and switching device 115) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
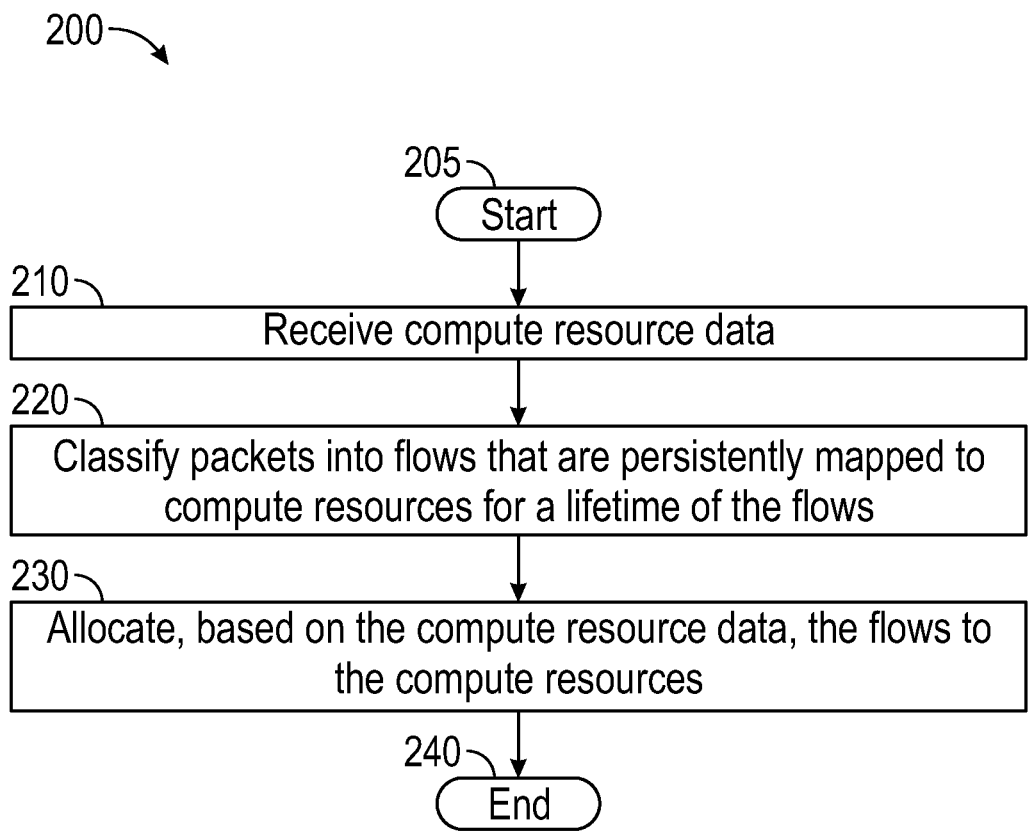
FIG. 2 is a flow chart of a method for providing intelligent distribution of packet flows.

FIG. 2 is a flow chart setting forth the general stages involved in a method 200 consistent with an embodiment of the disclosure for providing intelligent distribution of packet flows. Method 200 may be implemented using a flow device 110 as described in more detail above with respect to FIG. 1. Ways to implement the stages of method 200 will be described in greater detail below.

Method 200 may begin at starting block 205 and proceed to stage 210 where flow device 110 may receive compute resource data. For example, the compute resource data may comprise operating environment information, system performance information, network traffic characteristics, or historical trends in processing and bandwidth requirements of the flows. The operating environment information may comprise, but is not limited to, at least one of power consumption associated with the compute resources, a temperature associated with the compute resources, and a fan speed associated with the compute resources for example. The system performance information may comprise, but is not limited to, at least one of per-CPU performance monitor counters, per-CPU buffering occupancy, and internally interconnect Bandwidth (BW) for example. The network traffic characteristics may comprise, but are not limited to, at least one of application types, flow sizes, and time-of-day for example. Embodiments of the disclosure may use a secure authenticated interface to plurality of SPPs 105 to read or download real time processor and CPU core performance information such as various Performance Monitoring Unit (PMU) counters, frequency, thermal margins, temperature, memory utilization, cache performance counters, and turbo related information for all the available SPPs.

From stage 210, where flow device 110 receives the compute resource data, method 200 may advance to stage 220 where flow device 110 may classify packets into flows that are persistently mapped to compute resources for a lifetime of the flows. For example, software or hardware agents operating in flow device 110 or remote from flow device 110 may perform application recognition. These agents may inform flow device 110 of how to classify flows to applications and their characteristics, such classification may use techniques such as Application Visibility and Control (AVC) and Software-Defined AVC (SD-AVC).

Embodiments of the disclosure may use a software or hardware engine that may run a predictive model to decide packet distribution destination based on historical information about flow characteristics, system behavior, and operating environment. Examples may include, but are not limited to: i) flows occurring on specific days of the week, and or time of day; ii) flows contributing to a specific types of resource consumption (including, but not limited to, socket bandwidth, CPU core utilization, memory, and cache); and iii) current operating conditions and their impact on performance.

Furthermore, embodiments of the disclosure may include engines that: i) track flows and maintain persistent mapping to specific CPU resources; ii) adjust system operating conditions to account for performance requirements of current or future flow distribution decisions; and iii) provide a thermal and power management system to detect and allow cores to operate in turbo modes while staying within their thermal design limits.

Once flow device 110 classifies packets into flows that are persistently mapped to compute resources for a lifetime of the flows in stage 220, method 200 may continue to stage 230 where flow device 110 may allocate, based on the compute resource data, the flows to the compute resources. For example, flow device 110 may allocate the flows to CPU cores within plurality of SPPs 105 or a dedicated processor remote from plurality of SPPs 105. Some flows (e.g., high performance flows, i.e., elephant flows) and may be sent to a dedicated remote processor to be provided a higher service. Accordingly, embodiments of the disclosure may use intelligent distribution of packet flows to one or more compute resource complexes where packet processing may be performed. Once flow device 110 allocates, based on the compute resource data, the flows to the compute resources in stage 230, method 200 may then end at stage 240.

Flow device 110 may monitors each CPU workload by reading performance counters from multiple CPU sockets. For example, flow device 110 may monitor each CPU load and may use CPU utilization and power/frequency data to distribute the incoming new data flow to an appropriate CPU core, for example, the least loaded CPU core. A secure authentication channel may be created between flow device 110 and each of the processor sockets. Flow device 110 may use the secure channel to obtain and store vendor specific per core and per socket performance characteristics over time along with correlated flow information. As an example, a CPU may have internal counters that include the CPU socket power, socket temperature, core power, and thread effective frequency that may be made available to the intelligent distribution logic within flow device 110 that may analyze the data to assist with making future control and distribution decisions.

Flow device 110 may track packet buffer usage per-flow and per-CPU. Flow device 110 may keep track of the total number of outstanding high and low priority packet buffers for each CPU. It may then determine if a CPU is oversubscribed based upon how many outstanding packets may be waiting to be processed by that CPU. The more outstanding buffers there are, the more the CPU may be busy and less capable to handle new flows.

Flow device 110 may learn specific traffic flow behaviors. Then Flow device 110 may keep track of flows and their impact on CPU utilization with the intent of being able to identify the performance requirements of future flows and their impact on CPU utilization.

Consistent with embodiments of the disclosure, intelligent flow logic made of computing resources in flow device 110 (e.g., Artificial Intelligence (AI)/Machine Learning (ML) engines or custom logic) may run a predication model to decide the packet distribution destination based on the historical data of time-based flow type and core performance characteristics.

Flow device 110 may keep all historical flow databases in internal High Bandwidth Memory (HBM) or external Double Data Rate (DDR) memory. The AI/ML engines inside Flow device 110 may run the AI models that make predications based on the historical information. Flow device 110 may use the predication results to distribute a new packet flow to the predicated CPU core. Below lists the possible inputs of the AI/ML models:
  i) Flow dependency—tunnel or non-tunnel, features applied to the System-on-Chip (SoC) performance;
  ii) Time based dependencies—type of flows and traffic patterns and availability of sockets and distribution to be used;
  iii) Environment characteristics and SPP/Memory and system behavior—CPU and system power states, operating temperature, SPP and ASIC die temperature, operating altitude, fan speed, cores available for running turbo per socket in Non-Uniform Memory Access (NUMA) domain, cache performance parameters and map to historical and current packet flow behavior. This may also be monitored based time of day, hours of operation, etc.;
  iv) Latency for SoCs to come up from sleep to active; and
  v) Memory latencies and bandwidth utilization based on load and type of flow.

Software running on flow device 110 or an external controller may push additional information to flow device 110 that may further fine tune the aforementioned distribution process. This additional information may be sent via a separate side band channel, so the main data communications may not be affected.

Local software agents or a controller that may have application-level visibility may have more insight about the flow workload compared to what may be learned by flow device 110. As an example, a feature like AVC or SD-AVC running at a network level, may push additional information to an intelligent distribution engine in flow device 110. This information may then be combined along with the instantaneous and historical information learned by flow device 110 to make future flow distribution decisions.

With embodiments of the disclosure, profile tools may be gathering SoC level profile data from analysis tools running natively on SoCs. Collecting profile data may include using the following approaches:
  i) Timer Based Profiling (TBP)—to identify the hotspots;
  ii) Event Based Profiling (EBP)—sampling based on core Performance Monitoring Counter (PMC) events to identify micro-architecture related performance;

iii) Instruction Based Sampling (IBS)—precise instruction-based sampling
iv) Call-stack Sampling;
v) Thread concurrency; and
vi) System-wide: Profile all the running processes and/or kernel.

This information may be stored in a data-base using time-base and active flow base information to create a historical data view for analysis.

The following are three use case examples.

Underutilized

In an example use case, there may be sufficient workload occurring on each CPU core such that they all must remain active. None of the CPU cores may be over-subscribed, with each operating at, for example, 10% of its peak processing capabilities. All cores may be operating at nominal frequency.

With embodiments of the disclosure, flow device 110 may choose to only distribute workload to 1/10th of the available CPU cores, allowing the remaining unused cores to be idle thereby reducing overall power consumption. Additionally, the frequency of unused cores may be lowered to further reduce background processing power consumption and allowing other cores to run at higher frequencies if supported. The net result may be the same performance at lower power and thermals.

Underutilized with Aggregate Flow Oversubscription

In this example, there may be sufficient workload occurring on each CPU core such that all remain active. There may be some cores that are over-subscribed and unable to keep up with the workload they are being offered because of an imbalance in hashing, per-flow processing requirements, or per-flow bandwidth. The net offered load may be the same as in the underutilized case, but some packets may be dropped because of the poor distribution of workload resulting in a net lower performance compared to the underutilized case.

Embodiments of the disclosure may provide a flow distribution the may recognize that some CPU cores are becoming over-subscribed (e.g., by monitoring buffer occupancy towards those CPU cores) and chose to allocate new flows to CPU cores that may have more processing cycles available. Additionally, the frequency of cores that may be near over-subscription may be adjusted upwards to provide more compute capacity for already allocated flows. The net result may be higher performance at lower power and thermals.

Underutilized with Single Flow Oversubscription

In this example, there may be insufficient workload occurring on each CPU core to keep them all active, as a result some may be idle. Of the non-idle CPU cores, some may be oversubscribed due to higher performance flows (i.e., elephant flows) resulting in packet drops.

Embodiments of the disclosure may provide a flow distribution that may recognize that some CPU cores may be processing high performance flows (i.e., elephant flows) and choose to increase the frequency of such CPU cores to allow higher per-flow throughput. It may also be possible to predictively determine that a new flow may be a high-performance flow and choose to allocate it to CPU resources reserved specifically for higher performance flows. Such predictive insight may come from historical information about flows and/or may be informed by software application recognition technologies such as AVC and SD-AVC. The net result may be higher performance at similar power and thermals.

In addition to modifying CPU core frequencies, adjusting other system resources and components may also be performed. For example, fans may be adjusted to account for higher or lower temperatures due to changes in CPU core frequencies and buffer allocation may be adjusted to account for higher or lower bandwidth requirements for specific CPU cores.

Figure 3:
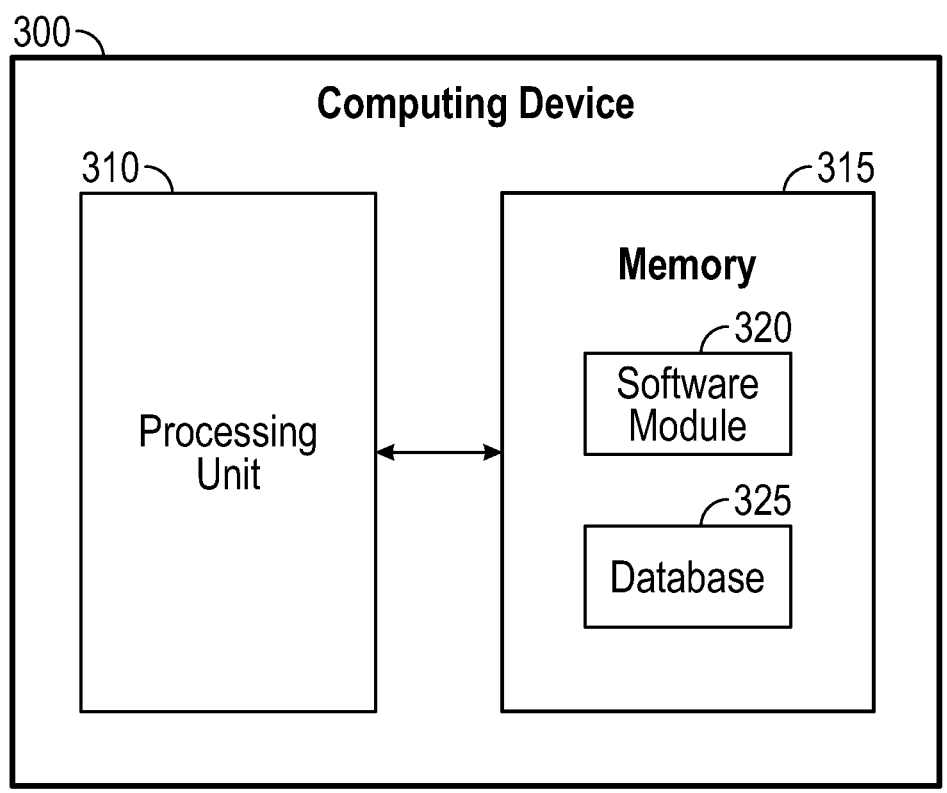
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing intelligent distribution of packet flows as described above with respect to FIG. 2. Computing device 300, for example, may provide an operating environment for flow device 110 and switching device 115. Flow device 110 and switching device 115 may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples, and computing device 300 may comprise other systems or devices.

Embodiment consistent with the disclosure may comprise a method for providing intelligent distribution of packet flows. The method may comprise receiving compute resource data, classifying packets into flows that are persistently mapped to compute resources for a lifetime of the flows, and allocating, based on the compute resource data, the flows to the compute resources. The compute resource data may comprise operating environment information. The operating environment information may comprise at least one of the following: power consumption associated with the compute resources; a temperature associated with the compute resources; and a fan speed associated with the compute resources. The compute resource data may comprise system performance information. The system performance information may comprise at least one of the following: per-CPU performance monitor counters; per-CPU buffering occupancy; and internally interconnect Band Width (BW). The compute resource data may comprise network traffic characteristics. The network traffic characteristics may comprise at least one of the following: application types; flow sizes; and time-of-day. The compute resource data may comprise historical trends in processing and bandwidth requirements of the flows.

Embodiments consistent with the invention may comprise a system for providing intelligent distribution of packet flows. The system may comprise a memory storage and a processing unit coupled to the memory storage. The processing unit may be operative to receive compute resource data, classify packets into flows that are persistently mapped to compute resources for a lifetime of the flows, and allocate, based on the compute resource data, the flows to the compute resources. The compute resource data may comprise operating environment information. The operating environment information may comprise at least one of the following: power consumption associated with the compute resources; a temperature associated with the compute resources; and a fan speed associated with the compute resources. The compute resource data may comprise system performance information. The system performance information may comprise at least one of the following: per-CPU performance monitor counters; per-CPU buffering occupancy; and internally interconnect Band Width (BW). The compute resource data may comprise network traffic characteristics. The network traffic characteristics may comprise at least one of the following: application types; flow sizes; and time-of-day. The compute resource data may comprise historical trends in processing and bandwidth requirements of the flows.

Embodiment consistent with the disclosure may comprise a computer-readable medium that stores a set of instructions which when executed perform a method executed by the set of instructions comprising. The method may comprise receiving compute resource data, classifying packets into flows that are persistently mapped to compute resources for a lifetime of the flows, and allocating, based on the compute resource data, the flows to the compute resources. The compute resource data may comprise operating environment information. The operating environment information may comprise at least one of the following: power consumption associated with the compute resources; a temperature associated with the compute resources; and a fan speed associated with the compute resources. The compute resource data may comprise system performance information. The system performance information may comprise at least one of the following: per-CPU performance monitor counters; per-CPU buffering occupancy; and internally interconnect Band Width (BW). The compute resource data may comprise network traffic characteristics. The network traffic characteristics may comprise at least one of the following: application types; flow sizes; and time-of-day. The compute resource data may comprise historical trends in processing and bandwidth requirements of the flows.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
    determining compute resource data associated with a networking switch, the networking switch being associated with a plurality of Stateful Packet Processors (SPPs), wherein determining the compute resource data associated with the networking switch comprises:
        determining operating environment information,
        determining current system performance information, and
        determining current network traffic characteristics;
    classifying packets into flows that are persistently mapped to compute resources for a lifetime of the flows;
    allocating, based on the compute resource data, the flows to the compute resources, wherein allocating the flows comprises allocating the flows to one of more SPPs of the plurality of SPPs based on the operating environment information, the current system performance information, and the current network traffic characteristics; and
    adjusting operating frequencies of one or more of the plurality of SPPs.

2. The method of claim 1, wherein the operating environment information comprises at least one of the following: power consumption associated with the compute resources; a temperature associated with the compute resources; and a fan speed associated with the compute resources.

3. The method of claim 1, wherein the system performance information comprises at least one of the following: per-CPU performance monitor counters; per-CPU buffering occupancy; and internally interconnect Band Width (BW).

4. The method of claim 1, wherein the network traffic characteristics comprise at least one of the following: application types; flow sizes; and time-of-day.

5. The method of claim 1, wherein the compute resource data comprises historical trends in processing and bandwidth requirements of the flows.

6. The method of claim 1, adjusting the operating frequencies of the one or more of the plurality of SPSs comprises adjusting the operating frequencies of one or more of the plurality of SPPs to account for performance requirements of the flows.

7. The method of claim 1, further comprising adjusting operating temperatures of one or more of the plurality of SPPs to account for performance requirements of the flows.

8. The method of claim 1, further comprising tracking the flows and maintaining persistent mapping to the one of more SPPs.

9. A system comprising:
    a memory storage; and
    a processing unit disposed in a switching device and coupled to the memory storage, wherein the processing unit is operative to:
        determine compute resource data associated with a networking switch, the networking switch being associated with a plurality of Stateful Packet Processors (SPPs), wherein the processing unit being operative to determine the compute resource data associated with the networking switch comprises the processing unit being operative to:
            determine operating environment information,
            determine current system performance information, and
            determine current network traffic characteristics;
        classify packets into flows that are persistently mapped to compute resources for a lifetime of the flows; and
        allocate, based on the compute resource data, the flows to the compute resources, wherein the processing unit being operative to allocate the flows comprises the processing unit being operative to allocate the flows to one of more SPPs of the plurality of SPPs based on the operating environment information, the current system performance information, and the current network traffic characteristics; and
        adjust operating temperatures of one or more of the plurality of SPPs.

10. The system of claim 9, wherein the operating environment information comprises at least one of the following: power consumption associated with the compute resources; a temperature associated with the compute resources; and a fan speed associated with the compute resources.

11. The system of claim 9, wherein the system performance information comprises at least one of the following: per-CPU performance monitor counters; per-CPU buffering occupancy; and internally interconnect Band Width (BW).

12. The system of claim 9, wherein the network traffic characteristics comprise at least one of the following: application types; flow sizes; and time-of-day.

13. The system of claim 9, wherein the processing unit is further operative to track the flows and maintain persistent mapping to the one of more SPPs.

14. The system of claim 9, wherein the processing unit is further operative to adjust the operating parameters comprises adjusting operating frequencies of one or more of the plurality of SPPs.

15. The system of claim 9, wherein each of the plurality of SPPs comprises a plurality of processors, and wherein each of the plurality of processors comprises one or more Central Processing Units (CPUs).

16. A non-transitory computer-readable medium that stores a set of instructions which when executed perform a method executed by the set of instructions comprising:
    determining compute resource data associated with a networking switch, the networking switch being associated with a plurality of Stateful Packet Processors (SPPs), wherein determining the compute resource data associated with the networking switch comprises:
        determining operating environment information,
        determining current system performance information, and
        determining current network traffic characteristics;
    classifying packets into flows that are persistently mapped to compute resources for a lifetime of the flows;
    allocating, based on the compute resource data, the flows to the compute resources, wherein allocating the flows comprises allocating the flows to one of more SPPs of the plurality of SPPs based on the operating environment information, the current system performance information, and the current network traffic characteristics; and
    adjusting operating frequencies of one or more of the plurality of SPPs.

17. The non-transitory computer-readable medium of claim 16, wherein the compute resource data further comprises historical trends in processing and bandwidth requirements of the flows.

18. The non-transitory computer-readable medium of claim 16, wherein each of the plurality of SPPs comprises a plurality of processors, and wherein each of the plurality of processors comprises one or more Central Processing Units (CPUs).

19. The non-transitory computer-readable medium of claim 16, further comprising tracking the flows and maintaining persistent mapping to the one of more SPPs.

20. The non-transitory computer-readable medium of claim 16, further comprising determining historical information about flow characteristics comprising specific type of compute resource consumption.

* * * * *